J. LEE.
EXPANSION BOLT.
APPLICATION FILED SEPT. 14, 1915.
1,244,992.
Patented Oct. 30, 1917.
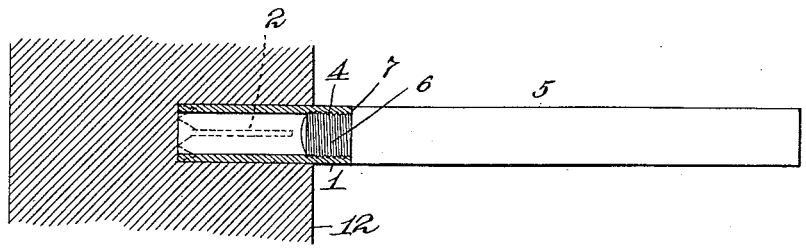
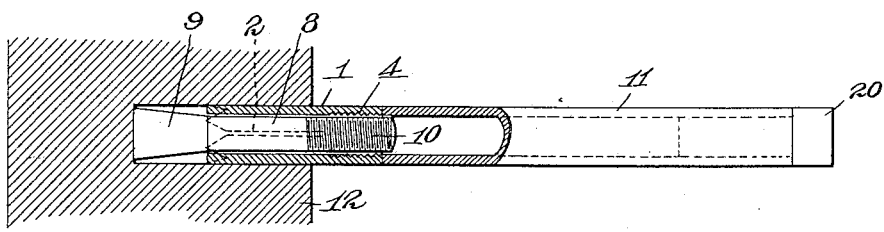
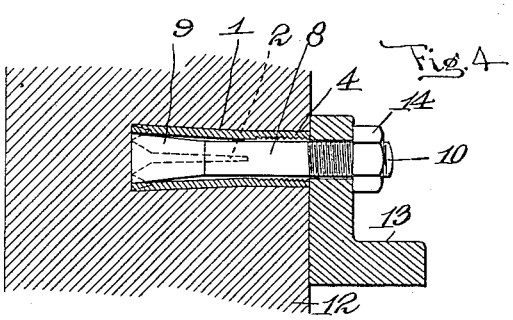
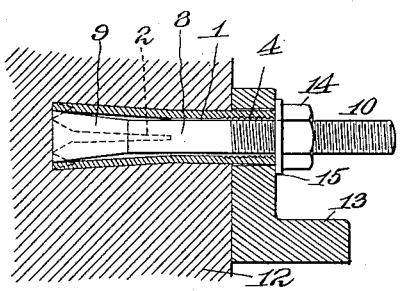
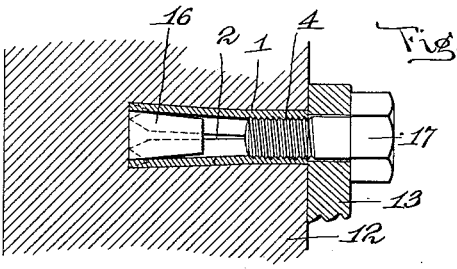
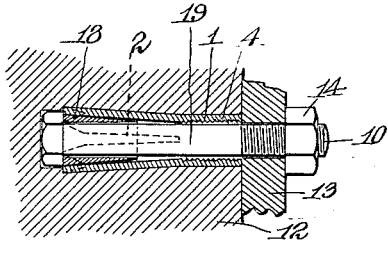
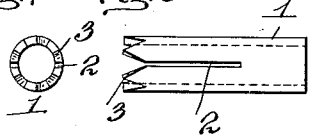
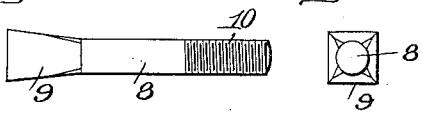
Witnesses:
Anna V. Renton.
J. F. Coleman
Inventor
Joseph Lee
By Peper & Taxson
Attorneys.

UNITED STATES PATENT OFFICE.

JOSEPH LEE, OF BROOKLYN, NEW YORK.

EXPANSION-BOLT.

1,244,992.  Specification of Letters Patent.  Patented Oct. 30, 1917.

Application filed September 14, 1915. Serial No. 50,572.

*To all whom it may concern:*

Be it known that I, JOSEPH LEE, a subject of the King of Great Britain and Ireland, and resident of the borough of Brooklyn, county of Kings, city and State of New York, have invented a certain new and useful Expansion-Bolt, of which the following is a specification.

This invention relates to improvements in expansion bolts. The principal object which I have in view is to facilitate the attachment of the bolt in place in a wall or other supporting surface.

A further object is to make an expansion bolt which will firmly hold the work in place.

These and further objects will more fully appear from the following specification and accompanying drawings, considered together or separately.

In the drawings,

Figure 1 is a view, partly in section of a body of an expansion bolt embodying my invention illustrated in connection with a tool used therewith;

Fig. 2 is a similar view of the same device, illustrated in connection with a wedge and stem and a seating or driving tool;

Fig. 3 is a sectional view of a complete bolt, embodying my invention;

Figs. 4, 5 and 6 are modifications of the same;

Fig. 7 is an end view of a body embodying the invention;

Fig. 8 is a side elevation of the same;

Fig. 9 is a side view of a wedge and stem, embodying my invention; and

Fig. 10 is an end view of the same.

In all views, like parts are designated by the same reference characters.

Referring first to Figs. 7 and 8, the body 1 of the bolt is preferably cylindrical. It is formed of soft steel or other material which may be expanded. To facilitate expansion, the body is preferably provided with one or more slots 2 extending from one end inward. Associated with the latter end are one or more cutting teeth or serrations 3. The serrated or toothed end of the body is case hardened for a short distance so that the chisel edges of the teeth may cut into a refractory material, such as brick or stone. This case hardening should not extend farther than is necessary to attain this object. Associated with the other end of the body are screw threads or other tool attaching means 4, see Figs. 2 and 3. In carrying out the invention, the body thus described, is first used in connection with a tool 5 (see Fig. 1). In the embodiment chosen for illustration this tool has a threaded extremity 6 adapted to engage with the threads 4. It also has a shoulder 7 adapted to engage with the body. The body with the tool attached thereto constitutes a device for cutting a cavity for attachment of the bolt within a wall. This tool is adapted to be rotated by hand while being driven by means of a hammer or otherwise, into a fixed surface to form the cavity in which the bolt is to be secured. After the cavity is cut to a sufficient depth, the tool and body are withdrawn and the two parts separated. Any material remaining within the cavity or in the bore of the tool is then removed. A stem 8 carrying a wedge 9 at one end is introduced in place within the body. The parts are then placed within the cavity with the wedge resting on the bottom thereof, see Fig. 2. The body is now forced against the wedge so that its slotted, serrated end will be expanded. Suitable means, such as a seating or driving tool 11, may be used for this purpose. The seating tool may be conveniently made of a length of tubing of the same diameter as the body 1 and with a head 20 secured in one end thereof. When driven in place, the wedge will expand the inner end of the body into contact with the walls of the cavity, thus firmly holding the parts in place. The wedge may be so proportioned that it will expand the body to such a degree that the walls of the cavity will be distorted, see Figs. 3 to 6. In the embodiment chosen for illustration the wedge 9 and stem 8 are united, forming a unitary structure. The stem 8 is shown as provided with screw threads 10 for the application of a nut 14. By this means the work 13 may be attached to a wall 12. In place of the seating or driving tool being used, the stem may be made sufficiently long so that a nut may be applied to the stem and caused to engage either with the work (see Fig. 3) or a washer 15 (see Fig. 4) to force the body over the wedge and expand the body. Instead of drilling the cavity by hand it is obvious that the tool 5 may be secured to a power drill and the operation carried out as with an ordinary bit.

In Fig. 4 the body extends through an opening in the work and the body therefore serves to support the work. According to this embodiment of the invention the body may be rotated to carry out the cutting operation by means of a tool applied to the outside of the body.

The invention may be modified in many other ways. For example, as shown in Fig. 5, the wedge 16 has no stem. It is inserted within the serrated end of the body and the latter with the wedge is then introduced within the cavity in the wall and then is driven in. The seating of the wedge against the base of the cavity while the body is being driven in, expands the slotted end of the body. The work is held in position by means of a tap bolt 17 engaging the screw threads 4.

In the modification illustrated in Fig. 6 the wedge 18 has a central opening for the passage of a headed bolt 19. The head of this bolt engages with the wedge and serves as an abutment for forcing the wedge into the body, and also serves to retain the bolt in place.

It will be understood that instead of making the wedge of pyramidal shape as shown, it may be conical.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention, what I claim as new and desire to secure by Letters Patent, is:

An expansion bolt having a hollow cylindrical member one end of which is slotted and carries cutting teeth, with means for removably attaching a tool to the end of the body opposite the teeth, whereby the body may be employed as a drill and by means of which the body may be removed from the cavity drilled thereby, a stem adapted to be placed within the body, said stem having a head of greater diameter than the bore of the body, said body, stem and head being seated in the cavity drilled by the body, and means for moving the body relatively to the stem whereby the slotted, toothed end of the body may be expanded into intimate contact with the walls of the cavity.

This specification signed and witnessed this 13th day of September, 1915.

JOSEPH LEE.

Witnesses:
J. F. COLEMAN,
ANNA G. RENTON.